(12) United States Patent
Levi et al.

(10) Patent No.: US 11,190,462 B2
(45) Date of Patent: *Nov. 30, 2021

(54) DIRECT PACKET PLACEMENT

(71) Applicant: MELLANOX TECHNOLOGIES, LTD., Yokneam (IL)

(72) Inventors: Dotan David Levi, Kiryat Motzkin (IL); Avi Urman, Yokneam Illit (IL); Lior Narkis, Petach Tikva (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 4 days.

This patent is subject to a terminal disclaimer.

(21) Appl. No.: 16/693,302

(22) Filed: Nov. 24, 2019

(65) Prior Publication Data

US 2020/0092229 A1 Mar. 19, 2020

Related U.S. Application Data

(63) Continuation-in-part of application No. 15/473,668, filed on Mar. 30, 2017, now Pat. No. 10,516,710.
(Continued)

(51) Int. Cl.
*G06F 15/16* (2006.01)
*H04L 12/939* (2013.01)
(Continued)

(52) U.S. Cl.
CPC .......... *H04L 49/552* (2013.01); *H04L 49/901* (2013.01); *H04L 49/9057* (2013.01);
(Continued)

(58) Field of Classification Search
CPC . H04L 49/552; H04L 49/9057; H04L 1/0041; H04L 65/4084; H04L 65/608; H04L 47/2416
See application file for complete search history.

(56) References Cited

U.S. PATENT DOCUMENTS 7,733,464 B2   6/2010   David et al.
7,881,496 B2   2/2011   Camilleri et al.
(Continued)

OTHER PUBLICATIONS

Wikipedia, "Common Public Radio Interface", 1 page, Apr. 28, 2017 (downloaded from https://web.archive.org/web/20190620212239/ https://en.wikipedia.org/wiki/Common_Public_Radio_Interface).
(Continued)

*Primary Examiner* — Umar Cheema
*Assistant Examiner* — Tesfu N Mekonen
(74) *Attorney, Agent, or Firm* — Kligler & Associates Patent Attorneys Ltd (57) ABSTRACT

Communication apparatus includes a host interface and a network interface, which receives from a packet communication network at least one packet stream including a sequence of data packets, which include headers containing respective sequence numbers and data payloads containing slices of the data segment having a predefined, fixed size per slice. Packet processing circuitry is configured to receive the data packets from the network interface, and to map the data payloads of the data packets in the at least one packet stream, using a linear mapping of the sequence numbers, to respective addresses in the buffer.

18 Claims, 5 Drawing Sheets

Related U.S. Application Data (60) Provisional application No. 62/457,919, filed on Feb. 12, 2017.

(51) Int. Cl.

| | | |
|---|---|---|
| *H04L 12/861* | (2013.01) | |
| *H04W 28/04* | (2009.01) | |
| *H04L 29/06* | (2006.01) | |
| *H04L 12/879* | (2013.01) | |

(52) U.S. Cl.
CPC ...... *H04L 49/9068* (2013.01); *H04L 65/4069* (2013.01); *H04L 65/608* (2013.01); *H04W 28/04* (2013.01)

(56) References Cited

U.S. PATENT DOCUMENTS

| | | | |
|---|---|---|---|
| 8,693,551 | B2 | 4/2014 | Zheludkov et al. |
| 9,131,235 | B2 | 9/2015 | Zheludkov et al. |
| 9,451,266 | B2 | 9/2016 | Zheludkov et al. |
| 2002/0041089 | A1 | 4/2002 | Yasui |
| 2004/0146203 | A1 | 7/2004 | Yoshimura et al. |
| 2004/0165091 | A1 | 8/2004 | Takemura et al. |
| 2006/0180670 | A1 | 8/2006 | Acosta et al. |
| 2007/0211157 | A1 | 9/2007 | Humpoletz et al. |
| 2007/0296849 | A1 | 12/2007 | Sano et al. |
| 2009/0021612 | A1 | 1/2009 | Hamilton, Jr. et al. |
| 2009/0034633 | A1* | 2/2009 | Rodirguez ..... H04N 21/234381 375/240.28 |
| 2009/0074079 | A1* | 3/2009 | Lee ...................... H04L 1/0047 375/240.25 |
| 2009/0153699 | A1 | 6/2009 | Satoh et al. |
| 2009/0244288 | A1 | 10/2009 | Fujimoto et al. |
| 2010/0149393 | A1 | 6/2010 | Zarnowski et al. |
| 2011/0283156 | A1* | 11/2011 | Hiie ...................... H04L 1/0042 714/746 |
| 2013/0329006 | A1 | 12/2013 | Boles et al. |
| 2015/0026542 | A1* | 1/2015 | Brennum ................ G06F 11/10 714/776 |
| 2016/0080755 | A1* | 3/2016 | Toma ................... H04N 21/631 375/240.25 |
| 2016/0277473 | A1* | 9/2016 | Botsford ............ H04N 21/2381 |
| 2017/0171167 | A1* | 6/2017 | Suzuki .................... H04L 69/16 |
| 2020/0076521 | A1* | 3/2020 | Hammond ......... H04B 17/0087 |

OTHER PUBLICATIONS

O-RAN Alliance, "O-RAN Fronthaul Working Group: Control, User and Synchronization Plane Specification", ORAN-WG4.CUS.0-v01.00 Technical Specification, pp. 1-189, year 2019.

Wikipedia, "evolved Common Public Radio Interface (eCPRI)", pp. 1-3, May 13, 2019 (downloaded from https://web.archive.org/web/20190513130801/https://wiki.wireshark.org/eCPRI).

Main Concept, "MainConcept Accelerates HEVC Encoding with NVIDIA RTX GPUs", newsletter, pp. 1-4, Apr. 8, 2019 downloaded from https://www.mainconcept.com/company/news/news-article/article/mainconcept-accelerates-hevc-encoding-with-nvidia-rtx-gpus.html.

U.S. Appl. No. 16/291,023 Office Action dated Nov. 20, 2020.
U.S. Appl. No. 16/442,581 Office Action dated Nov. 30, 2020.
U.S. Appl. No. 16/850,036 Office Action dated Sep. 8, 2021.

* cited by examiner

DIRECT PACKET PLACEMENT

CROSS-REFERENCE TO RELATED APPLICATION

This application is a continuation in part of U.S. patent application Ser. No. 15/473,668, filed Mar. 30, 2017, which claims the benefit of U.S. Provisional Patent Application 62/457,919, filed Feb. 12, 2017, which is incorporated herein by reference.

FIELD OF THE INVENTION

The present invention relates to apparatus and methods for transmission and reception of packet streams across a network with high speed and reliability.

BACKGROUND

High-speed packet streaming schemes are commonly used in transmitting real-time video and other digital media across a network. Because of the real-time nature of the data, the packet transmissions typically use a non-reliable protocol, without acknowledgment from the destination or retransmission by the source when packets are lost or corrupted. Therefore, in applications requiring high data availability, a source host may transmit multiple parallel, redundant streams of the data to the destination. Each packet is thus transmitted multiple times—once in each stream— over multiple different paths through the network—in order to increase the likelihood that at least one copy of each packet will be received intact at the destination.

In this sort of scheme, there is still no guarantee that all the packets in any given stream will reach the destination, nor can it be ensured that the packets will arrive at the destination in the order in which they were transmitted. Therefore, in many applications (such as broadcast or storage of the video data), the destination computer must store, reorder and interleave packets from the two (or more) received streams in order to reconstruct the data. This solution enables reliable video reconstruction, but at the cost of a substantial memory footprint and a heavy processing burden on the host processor, which increases data latency and can limit the data throughput.

Various schemes for handling data from redundant transmissions are known in the art. For example, U.S. Patent Application Publication 2009/0034633 describes a method for simultaneous processing of media and redundancy streams for mitigating impairments. The method comprises receiving a primary stream of encoded frames and a separate stream of redundant frames. The method further comprises decoding and reconstructing in parallel the frames in the primary stream and the separate stream of redundant frames, on a real-time basis, in accordance with a specified common clock reference. The method further comprises, upon determining that a frame in the primary stream exhibits an error or impairment, determining a decoded redundant frame in the separate stream that corresponds to the impaired frame, and substituting at least a portion of the information in the decoded redundant frame for a corresponding decoded version of the impaired frame.

SUMMARY

Embodiments of the present invention that are described herein provide efficient apparatus and methods for receiving and handling redundant data streams from a network.

There is therefore provided, in accordance with an embodiment of the invention, communication apparatus, including a host interface, which is configured to be connected to a bus of a host computer having a processor and a memory, in which a buffer is allocated for receiving a data segment. A network interface is configured to receive from a packet communication network at least first and second redundant packet streams. Each packet stream includes a sequence of data packets, which include headers containing respective packet sequence numbers and data payloads of a predefined, fixed size containing respective slices of the data segment, such that redundant first and second copies of each slice are transmitted respectively in at least a first data packet in the first packet stream and a second data packet in the second packet stream. Packet processing circuitry is configured to receive the data packets from the network interface, to map the data packets in both the first and second packet streams, using the packet sequence numbers, to respective addresses in the buffer, and to write the data payloads to the respective addresses via the host interface while eliminating redundant data so that the buffer contains exactly one copy of each slice of the data segment, ordered in accordance with the packet sequence numbers.

In some embodiments, the packet processing circuitry is configured to map the packet sequence numbers to the respective addresses, using a linear mapping defined so that the first and second copies of any given data slice are both mapped to a common address in the buffer. In a disclosed embodiment, the mapping is defined such that each packet sequence number PSN is mapped to an address equal to A+(PSN−X)×B, wherein X is an initial sequence number, B is the fixed size of the data payloads, and A is a base address of the buffer.

In some embodiments, the data payloads include video data, including multiple data segments corresponding to frames of the video data. In one embodiment, the headers contain an indication of a start and end of each frame, and the packet processing circuitry is configured to identify the indication in the headers and to select the buffer to which the data payloads are to be written responsively to the identified indication.

In a disclosed embodiment, the packet processing circuitry is configured to maintain a record of the packet sequence numbers for which the data payloads have been written to the buffer, and responsively to the record, to discard redundant copies of the data payloads so that each slice is transmitted over the bus via the host interface no more than once. Alternatively, the packet processing circuitry is configured to transmit all of the copies of each slice over the bus so that the redundant data in the buffer are overwritten.

In a disclosed embodiment, the packet processing circuitry is configured to receive a work item from the processor indicating, for each data segment, an address of the buffer and the size of the slices, and to submit a completion report to the processor when all slices of the data segment have been written to the buffer.

In one embodiment, the first and second packet streams are transmitted in accordance with a Real-time Transport Protocol (RTP), and the headers include an RTP header, which contains the packet sequence numbers.

There is also provided, in accordance with an embodiment of the invention, a method for data communication, including allocating a buffer in a memory of a host computer for receiving a data segment. At least first and second redundant packet streams are received in a network interface controller (NIC) of the host computer from a packet communication network. Each packet stream includes a sequence of data packets, which include headers containing respective packet sequence numbers and data payloads of a predefined, fixed size containing respective slices of the data segment, such that redundant first and second copies of each slice are transmitted respectively in at least a first data packet in the first packet stream and a second data packet in the second packet stream. The data packets in both the first and second packet streams are mapped, using the packet sequence numbers, to respective addresses in the buffer. The data payloads are written to the respective addresses in the buffer while eliminating redundant data so that the buffer contains exactly one copy of each slice of the data segment, ordered in accordance with the packet sequence numbers.

There is additionally provided, in accordance with an embodiment of the invention, a method for data communication, which includes allocating a buffer in a memory of a host computer for receiving a data segment. A packet stream including a sequence of data packets, which include headers containing respective packet sequence numbers and data payloads of a predefined, fixed size containing respective slices of the data segment, is received in a network interface controller (NIC) of the host computer from a packet communication network. The data packets in the packet stream are mapped to respective addresses in the buffer using a linear mapping of the packet sequence numbers to the addresses. The data payloads are written to the respective addresses in the buffer, ordered in accordance with the packet sequence numbers.

The present invention will be more fully understood from the following detailed description of the embodiments thereof, taken together with the drawings in which:

DETAILED DESCRIPTION OF EMBODIMENTS

In many real time streaming protocols, such as the Real-time Transport Protocol (RTP), each of the packets in each transmitted stream contains a respective sequence number, such as a packet sequence number (PSN), which can be used at the destination in detecting missing packets and restoring the packet data to the transmit order. In the present embodiments, as explained in detail hereinbelow, these reordering and reconstruction functions are carried out by hardware logic in the network interface controller (NIC) of the destination computer, thus offloading these tasks from the host processor. Although the disclosed embodiments relate to a single stream of data (which in some cases is duplicated in at least one redundant stream), in general the destination computer may receive and process many such streams concurrently from different sources.

In some embodiments, the destination host processor allocates a single buffer to receive the reconstructed video data in each segment of an incoming data stream, for example, in each video frame, based on the expected segment size and data rate. These stream parameters may be preset or negotiated in each instance by exchange of control messages over the network between the source and destination hosts. The packet sizes can thus be assumed to be fixed and known to the host processors. Each transmitted packet is labeled with a successive sequence number, as provided by RTP or another suitable protocol.

The receiving NIC performs the functions of data integrity checking, packet reordering, and elimination of redundant data, using the known packet data sizes and sequence numbers. Thus the receiving NIC writes the data payloads to the proper locations in the allocated buffer, in accordance with the transmit order (and irrespective of the receive order), while discarding or overwriting the data from redundant packets. The receiving NIC notifies the destination host processor only when the data segment in memory is complete. The process of packet reception and reordering is thus entirely transparent to the destination host processor, which deals only with complete data segments. Assuming the receiving NIC is able to receive data from the network at wire speed, the latency and throughput of video data transfer at the destination are limited only by the processing and bus access rates of the receiving NIC. This solution not only maximizes data bandwidth, but also substantially reduces the processing load, memory footprint, and power consumption of the host processor.

Figure 5:
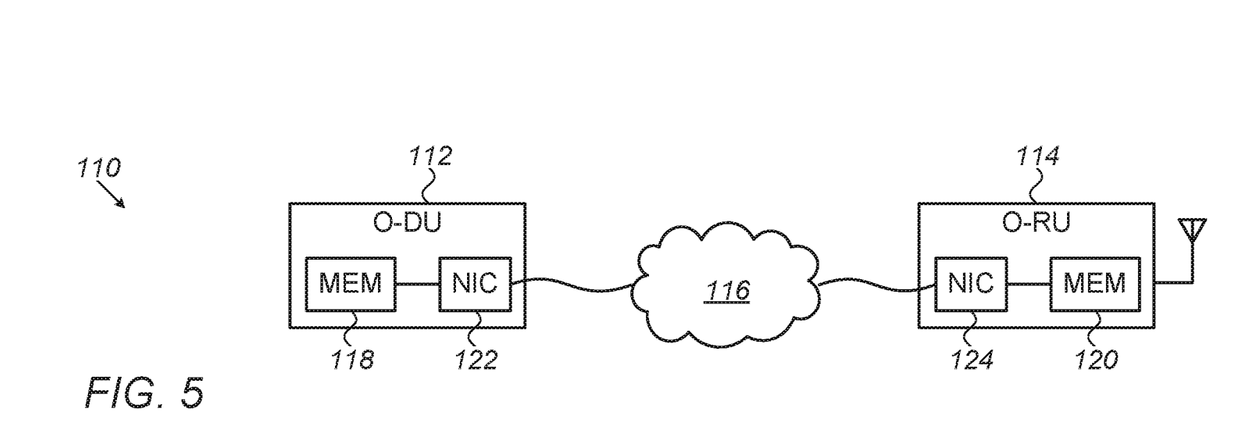
FIG. 5 is a block diagram that schematically illustrates a data communication system, in accordance with another embodiment of the invention.
Figure 6:
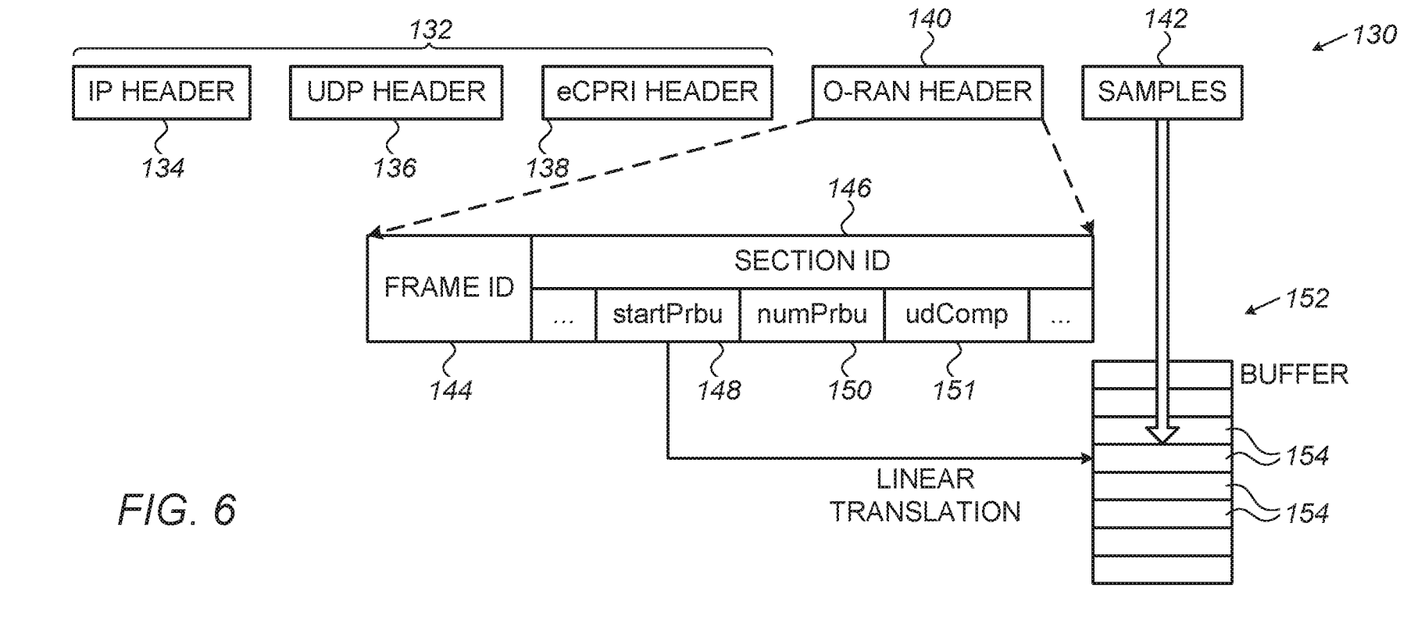
FIG. 6 is a block diagram that schematically illustrates a method for direct placement of packet data, in accordance with the embodiment of FIG. 5.

Although the above embodiments relate specifically to scenarios in which the source host transmits multiple redundant streams of packets to the destination, the principles of the present invention may similarly be applied to single streams of packets (transmitted without redundancy), as well as to schemes with higher degrees of redundancy. Furthermore, although the above embodiments make use of the packet sequence numbers of the video packets, other embodiments make use of other sorts of sequence numbers that appear in the packet header, with data payloads containing slices of a data segment having a predefined, fixed size per slice. The NIC uses the sequence numbers, along with the fixed size per slice, in mapping the data payloads to respective addresses in the assigned memory buffer using a linear mapping of the sequence numbers. For example, in an alternative embodiment (as illustrated in FIGS. 5 and 6), a packet stream is transmitted in accordance with an enhanced Common Public Radio Interface (eCPRI), and the data payloads that are to be written to a buffer by the receiving NIC comprise radio data. In one of these embodiments, the headers comprise an open radio access network (O-RAN) application layer header, and the starting physical resource block (startPrbu) values contained in the O-RAN header serve as sequence numbers.

Figure 1:
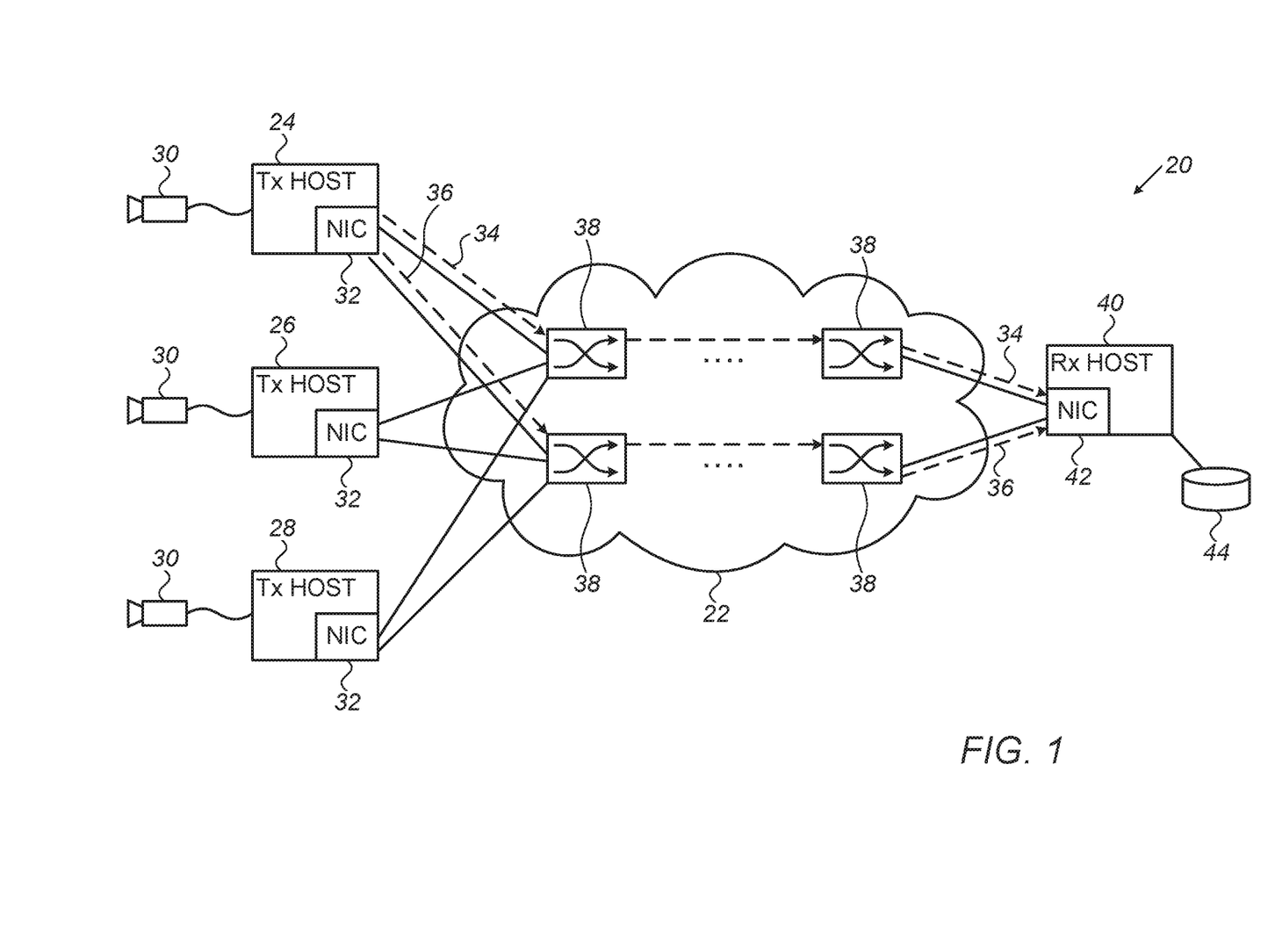
FIG. 1 is a block diagram that schematically illustrates a data communication system, in accordance with an embodiment of the invention.

FIG. 1 is a block diagram that schematically illustrates a data communication system 20, in accordance with an embodiment of the invention. In the pictured scenario, multiple transmitting (Tx) host computers 24, 26, 28, . . . , are connected to a packet data network 22, such as an Internet Protocol (IP) network, for example. Each host computer receives a streaming data input, for example from a respective video camera 30. This data input comprises a series of data segments, such as video frame or fields, of a predefined size. The host computer encapsulates the data in a stream of data packets, each comprising a header, containing, inter alia, a respective PSN, and a data payload of a predefined, fixed size containing a respective slice of a given data segment. Although host computers 24, 26, 28 and respective video cameras 30 are shown in FIG. 1, for the sake of conceptual clarity, as separate physical entities, in some implementations the host computer is incorporated into the video camera (typically together with a NIC, as well).

A NIC 32 in each host computer 24, 26, 28, . . . , transmits the data packets over network 22 in two redundant packet streams 34 and 36, as indicated by the dashed arrows in FIG. 1. Thus, redundant copies of each slice are transmitted concurrently in two packets, one in each of the two packet streams. Streams 34 and 36 are typically transmitted through network 22 over different, respective paths, for example by transmitting the streams through different ports of NIC 32, which are connected respectively to different switches 38 in the network. The packets are typically transmitted using an unreliable transport protocol, such as RTP over User Datagram Protocol (UDP) transport, which gives no guarantee that any given packet will reach its destination. Transmitting the two redundant streams ensures that at least one copy of each packet will, with few exceptions, reach its destination. For even higher confidence of delivery, three or even more redundant streams can be transmitted and handled at the receiver in the manner described herein. Alternatively, as noted above, the techniques described herein are useful in efficient handling of even a single packet stream by a receiving NIC, when redundancy is not required.

Streams 34 and 36, as well as the packet streams transmitted by hosts 26, 28, . . . , are addressed to a receiving (Rx) host computer 40, which is connected to network 22 by a NIC 42. Upon receiving the data packets from network 22, NIC 42 maps the packets in both of packet streams 34 and 36, using the packet sequence numbers, to respective addresses in a buffer in a memory 44 of host computer 40. NIC 42 writes the data payloads to the respective addresses while eliminating redundant data so that the buffer contains exactly one copy of each slice of the data segment, ordered in accordance with the packet sequence numbers. The video frames are thus immediately available in memory for retransmission (over a television network, for example) or other access.

Figure 2:
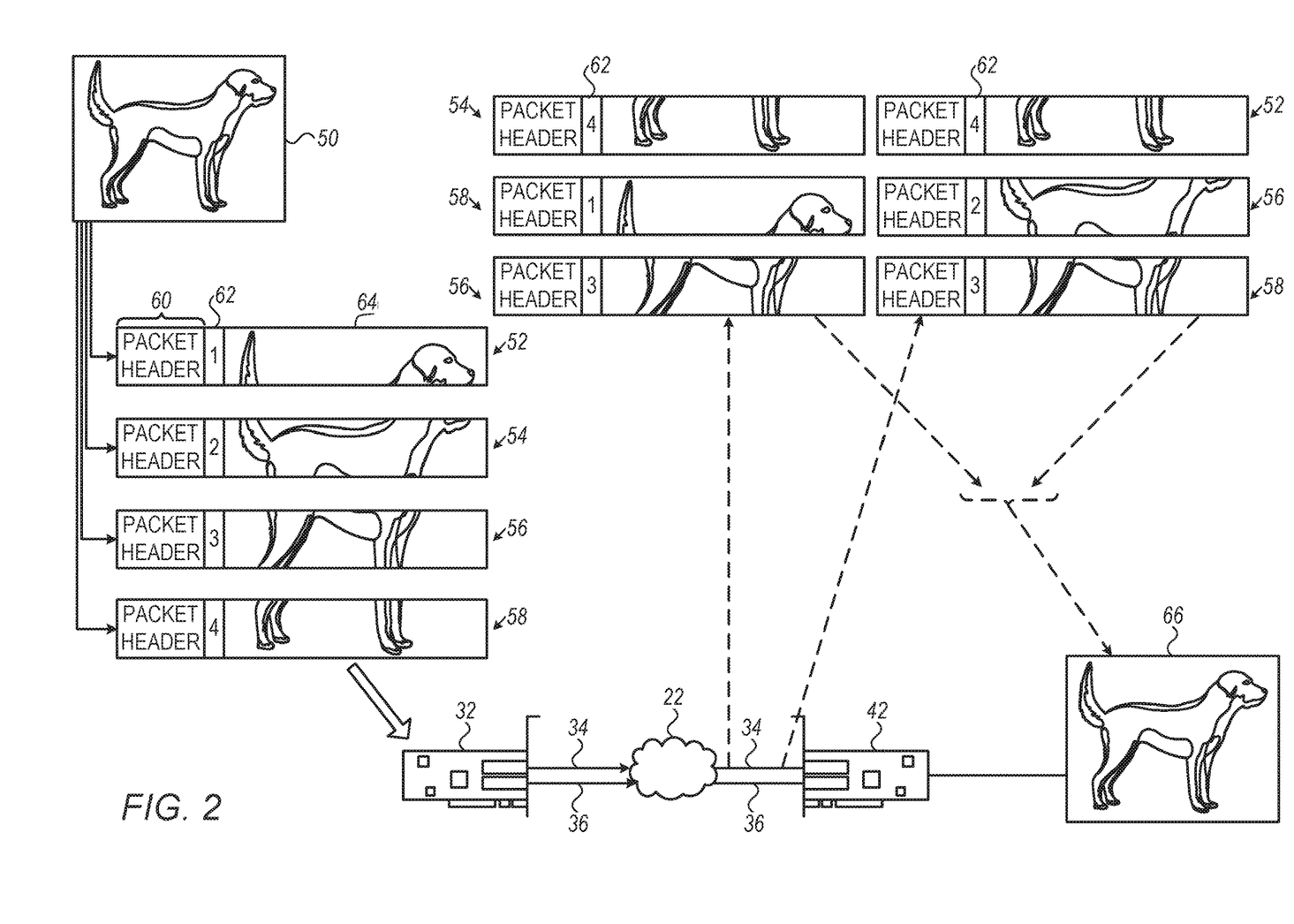
FIG. 2 is a block diagram that schematically illustrates a process of data reconstruction that is carried out by a network interface controller (NIC), in accordance with an embodiment of the invention.

FIG. 2 is a block diagram that schematically illustrates a process of data reconstruction that is carried out by NIC 42, in accordance with an embodiment of the invention. Video camera 30 captures an image frame 50, which is divided into slices for transmission by NIC 32 in a sequence of data packets 52, 54, 56, 58. Each packet comprises a header 60, containing a packet sequence number (PSN) 62, and a payload 64 containing a respective slice of image frame 50. NIC 32 transmits two copies of each packet 52, 54, 56, 58, i.e., one in each of streams 34 and 36.

In the pictured scenario, certain packets are lost or corrupted in transmission through network 22, and others reach NIC 42 out of order. NIC 42 detects and discards corrupted packets, for example by computing and checking packet checksums or other error detection codes, as provided by the applicable protocols. In the pictured example, NIC 42 has received only packets 54, 58 and 56 (in that order) from stream 34 and packets 52, 56 and 58 from stream 36. Using packet serial numbers 62, however, NIC 42 is able to directly place data from the appropriate payloads 64 in the designated buffer in memory 44, and thus reconstruct a complete image frame 66 in memory 44. As noted earlier, NIC 42 eliminates redundant data so that the buffer contains exactly one copy of each slice of the frame, ordered in accordance with the packet sequence numbers. The process of reconstruction is transparent to software running on host computer 40 and requires no involvement by the software in data reordering or eliminating redundancies.

Figure 3:
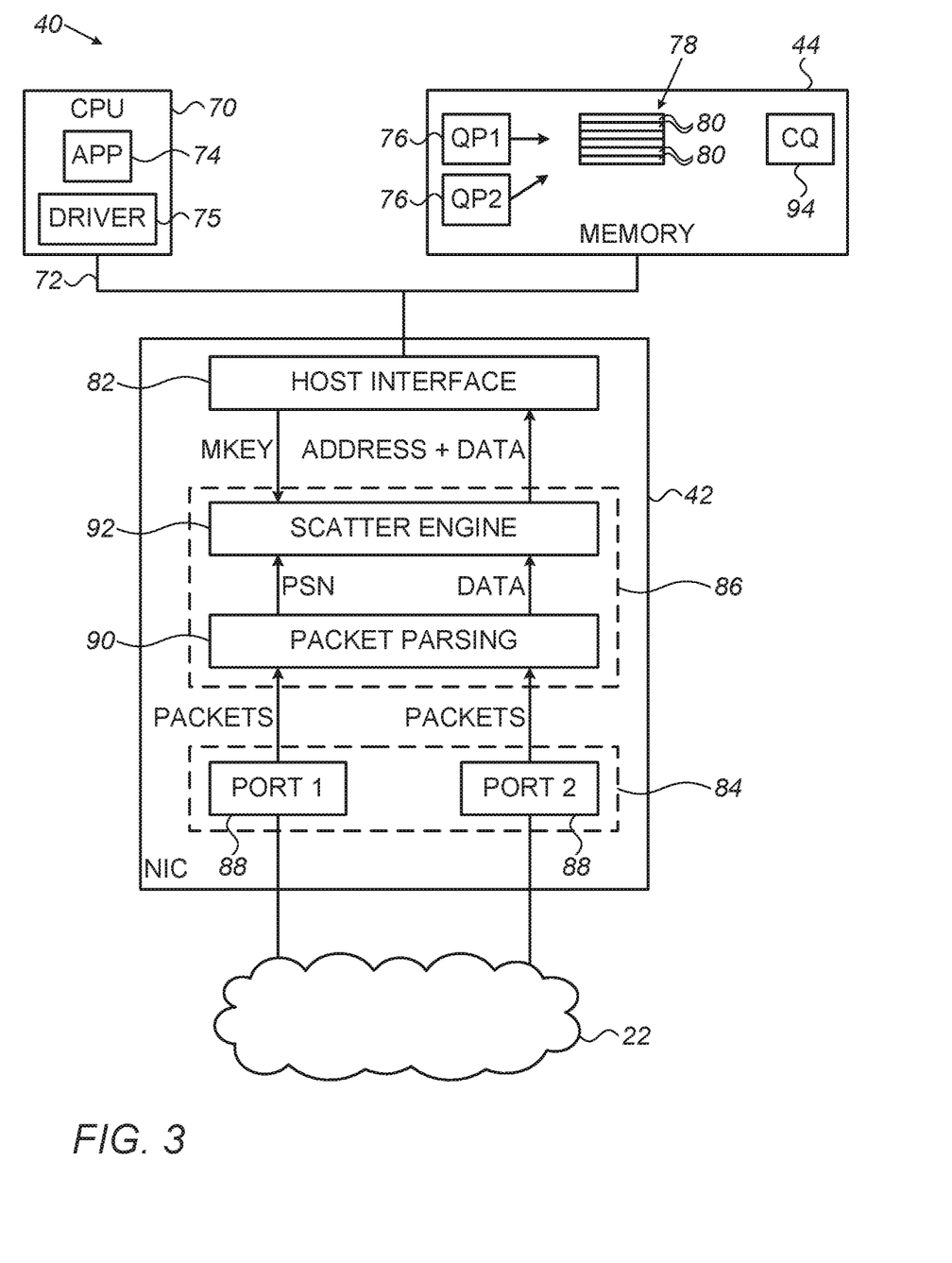
FIG. 3 is a block diagram that schematically illustrates a host computer with a NIC, in accordance with an embodiment of the invention.

FIG. 3 is a block diagram that schematically shows details of host computer 40 and NIC 42, in accordance with an embodiment of the invention. Host computer 40 comprises a processor 70, typically comprising at least one central processing unit (CPU), and memory 44, which are connected to NIC 42 by a host bus 72, such as a PCI Express® bus, as is known in the art. Processor 70 runs various software programs, including, in this example, a video processing application 74 and a driver 75 for controlling operation of NIC 42.

Driver 75 creates a respective work queue 76 (conventionally referred to as a queue pair, or QP) for each incoming stream of video packets that NIC 42 is to receive. For each segment in the incoming stream (such as a video frame) that NIC 42 is to receive, driver 75 posts a corresponding work item (referred to as a work queue element, or WQE) in the appropriate work queue 76 pointing to a buffer 78 that is to receive the data in the segment. In some embodiments, this functionality is implemented as follows:

Driver 75, upon receiving a control message indicating that such a video stream is to be initiated, creates a QP for the flow, and specifies the following parameters, for example in the QP context in memory 44, to be accessed by NIC 42 via bus 72:

Packet size;

Header size;

Range of expected packet sequence numbers in the segment;

PSN offset within the packet header;

Size and offset of the payload data (excluding the frame checksum that follows the data).

In some embodiments, for every segment (which may comprise tens, hundreds, or even thousands of IP packets), the driver 75 posts a WQE in queue 76 containing the following information, to be accessed by NIC 42:

Segment PSN start (X);

Segment buffer base address (A).

The WQE thus specifies the location and contents of buffer 78, which is divided into slices 80 of the payload size indicated by the QP context. In some implementations, the WQE contains a memory key (MKEY), to be used by NIC 42 in accessing buffer 78. Alternatively, the above information can be included in the QP context, which points to a cyclic buffer to which NIC 42 will write slices 80 in succession (thus relieving the software of the burden of continually allocating buffers and posting WQEs).

When another identical, redundant flow is to be sent in a second stream, driver 75 creates another QP, specifying the same parameters (packet size, header size, etc.)

For every segment of this redundant flow, the software will post the following information to the NIC:

Segment PSN start (Y)—The two streams need not have the same PSNs, although it is simpler if Y=X. If not, driver 75 provides NIC 42 with the necessary context information to synchronize between the corresponding packet sequence numbers in the two streams.

Segment buffer base address (A).

The result will be that both copies of any given data slice are mapped to a common slice address in buffer 78, and thus the corresponding, redundant data will be written to the same place in the host memory, regardless of the arrival order.

NIC 42 comprises a host interface 82, connected to bus 72, and a network interface 84, which connects to network 22. Network interface 84 in this example comprises two ports 88 with different addresses, serving as the respective destination addresses for streams 34 and 36. Alternatively, both streams may be received through the same port.

Packet processing circuitry 86 is coupled between host interface 82 and network interface 84. For the sake of simplicity, FIG. 3 shows only certain specific elements of packet processing circuitry 86: packet parsing logic 90 and a scatter engine 92, which are used in implementing the direct data placement functionality that is the subject of the present description. In a typical NIC, these elements are combined with other components for transmitting and receiving packets for other purposes and in accordance with other sorts of protocols. These latter components will be apparent to those skilled in the art and are beyond the scope of the present description. Packet processing circuitry 86, including parsing logic 90 and scatter engine 92, is typically implemented in hardware logic circuits within one or more integrated circuit chips. The logic may be hard-wired or programmable, or a combination of hard-wired and programmable elements. Additionally or alternatively, certain functions of packet processing circuitry 86 may be carried out in software or firmware by an embedded microprocessor or microcontroller.

Network interface 84 passes incoming packets in streams 34 and 36 to packet parsing logic 90. To process these packets, packet processing circuitry 86 reads and makes use of the information posted in the appropriate work queue 76 in memory 44 by driver 75. This information enables packet parsing logic 90 to locate and extract PSN 62 and payload 64 from each packet. Scatter engine 92 uses PSN 62, together with the base address of buffer 78, to map each slice 80 to the respective address in the buffer, and thus to write the data payloads to the appropriate addresses via host interface 82.

Figure 4:
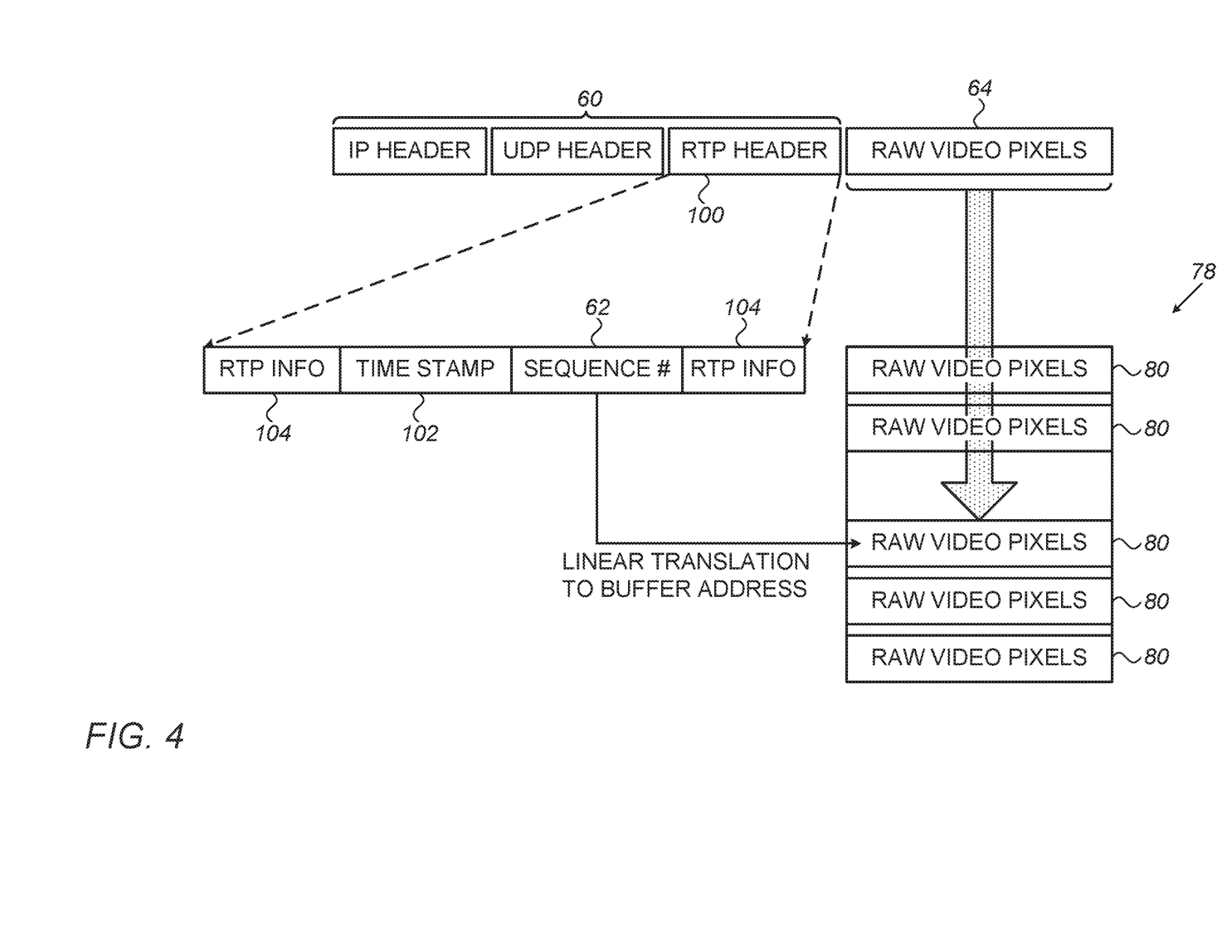
FIG. 4 is a block diagram that schematically illustrates a method for direct placement of packet data, in accordance with an embodiment of the invention.

FIG. 4 is a block diagram that schematically shows details of a method for direct placement of packet data that is performed by NIC 42, in accordance with an embodiment of the invention. FIG. 4 illustrates how scatter engine 92 uses PSN 62 in an RTP header 100 of a video packet in placing the packet data in buffer 78. Other examples of video networking protocols that can be handled in similar fashion include (without limitation):

SMPTE 2022-5/6/7
VSF TR-03/IETF RFC 4175
intoPIX TICO
Sony IP Live RDD 34 and NMI
NewTek
GigE vision GVSP The packet illustrated in FIG. 4 belongs to a stream in which the payload size of all packets is fixed and known in advance. Driver 75 running on host processor 70 assigns and informs NIC 42 of the base address of buffer 78 to which each data segment in the stream is to be written, as explained above. Within packet header 60, RTP header 100 comprises a timestamp 102 and other protocol information 104, in addition to PSN 62. Based on the context information provided by driver 75, packet parsing logic 90 advances to the known location of PSN 62 in each packet and extracts the PSN value, as well as extracting data slice 80 from payload 64. On this basis, scatter engine 92 is able to write the data slices from payloads 64 to buffer 78 in the proper order by simple linear translation of the PSN.

In other words, for a packet stream beginning from an initial sequence number X, with a data payload of size B in each packet, and a buffer base address A, scatter engine 92 will write the payload of each packet to an address:

$$\text{Payload address} = A + (\text{PSN} - X) \times B.$$

When the payloads of two valid packets from different, respective streams in a redundant transmission scheme map to the same address (whether they have the same or different PSNs), only one of them will ultimately be written to the buffer. Scatter engine 92 may overwrite the payload of the packet that arrives first with that of the second copy of the packet, or it may write only one of the payloads to the buffer and discard the other.

For some protocols, the segment definition is also indicated in the packet headers, thus enabling alternative implementations that reduce the involvement of driver software even further. For example:

A segment in most video applications corresponds to a single frame (or a single field of interlaced video).

In some video protocols, a frame-end marker is entered in the packet transport header: The first and last packets in the segment are identified by a special field in the transport header indicating that they are the first or last packet.

When the frame size is fixed and the frame start and end are marked in the headers in this manner, the NIC can automatically start to write the data into the allocated host buffers when the start marker is received. Thus, the need to specify segment boundaries is also offloaded from the software to the NIC hardware logic.

For a NIC operating at very high speed (for example, receiving incoming video data at 400 Gbps), access from NIC 42 to memory 44 over bus 72 can become a bottleneck. To reduce the bus pressure, packet processing circuitry 86 can monitor PSNs and, when the payload from a given packet having a given PSN in one of the streams has already been written to the buffer, simply discard the corresponding packet from the other stream, rather than overwriting the data already in the buffer. For this purpose, processing circuitry 86 may maintain a record, such as a PSN vector and a rolling PSN window, for each flow. Each packet arriving causes processing circuitry 86 to flip a bit in the PSN vector. When the bit for a given PSN is set when corresponding packet from the other stream arrives, packet parsing logic 90 drops this latter packet without further processing.

FIG. 5 is a block diagram that schematically illustrates a data communication system 110 for transmission of radio data, in accordance with another embodiment of the invention. System 110 is assumed to operate in accordance with the enhanced Common Public Radio Interface (eCPRI) specification, and the Open Radio Access Network (O-RAN) fronthaul requirements, as defined in the O-RAN Fronthaul Working Group Control, User and Synchronization Plane Specification, published by the O-RAN Alliance as Technical Specification ORAN-WG4.CUS.0-v01.00 (2019).

In system 110, an O-RAN Distributed Unit (O-DU) 112 communicates over a network 116, such as an IP network, for example, with an O-RAN Radio Unit (O-RU) 114, in accordance with the above-mentioned eCPRI and O-RAN specifications. O-DU 112 and O-RU 114 comprise general-purpose computer processors, which have respective memories 118, 120 and are connected to network 116 by respective NICs 122 and 124. (O-DU 112 and O-RU 114 typically have other, special-purpose interfaces, such as a radio transceiver associated with the O-RU, but these features of system 110 are beyond the scope of the present description.)

O-RU 112 transmits a sequence of data packets over network 116, comprising respective headers and data payloads, which contain data segments of radio signals received by O-RU 114. Each data segment comprises one or more physical resource blocks (PRBs), which are divided into slices in the form of data samples, typically comprising alternating iSamples and qSamples, as defined by the O-RAN specification (see particularly section 6.3, including Table 6-2 on page 95). These samples have a fixed size, between 1 bit and 16 bits per sample, which is defined in the O-RAN header of each packet, as explained below with reference to FIG. 6. NIC 124 transmits the data packets over network 116, typically using an unreliable transport protocol, such as eCPRI over UDP transport. Upon receiving the data packets from network 116, NIC 122 maps the samples contained in the packets to respective addresses in a buffer in memory 118 of O-DU 112, with the samples ordered in the buffer in accordance with respective sequence numbers given by the O-RAN headers in the packets. The radio data are thus made immediately available in memory 120, in the proper order for processing by O-DU 112.

FIG. 6 is a block diagram that schematically illustrates a method for direct placement of packet data in a buffer 152 in memory 118, in accordance with the embodiment of FIG. 5. The method is applied to the O-RAN data packets that are received by O-DU 112, illustrated in FIG. 6 by a packet 130. This packet has network and transport headers 132, including an IP header 134, a UDP header 136, and an eCPRI header 138, for example as defined in section 3.1.3 of the above-mentioned O-RAN specification (page 32). The transport headers are followed by an O-RAN application header 140 (as defined in Table 6-2 of the O-RAN specification) and a payload 142 containing a sequence of data samples. O-RAN header 140 comprises a set of frameID fields 144, followed by sectionID fields 146, which define the data layout of the data segment in payload 142. These section ID fields include, inter alia, a startPrbu field 148, which identifies the starting physical resource block (PRB) in packet 130 and thus can serve as a sequence number for purposes of mapping of the samples in payload 142. A numPrbu field 150 indicates the number of contiguous PRBs in this section; and a udCompHdr field 151 indicates the size, in bits, of each sample, i.e., the size of each slice of the PRB in payload 142. When a data packet contains multiple sections of data, section ID fields 146 will be repeated as the header of each section.

NIC 122 extracts the data samples from payload and writes them to respective addresses 154 in a buffer 152 in memory 118, using a linear mapping of the startPrbu value in field 148. The startPrbu value indicates the address 154 to which the NIC is to write the first sample in each section, followed contiguously by the succeeding samples. Specifically, in the present embodiment, NIC 122 maps the samples to addresses 154 using the following formula for the first sample in each section:

$$\text{Payload address} = A + (SN-X) \times B.$$

Here X is the initial sequence number; SN is the current sequence number given by the startPrbu value in field 148; B is the fixed size of the samples, given by the udCompHdr value in field 151; and A is a base address of the buffer.

Although the embodiment described above refers specifically to transmission of data from O-RU 114 to O-DU 112, the principles of this embodiment may similarly be applied by O-RU 114 in buffering data transmitted by O-DU 112.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
a host interface, which is configured to be connected to a bus of a host computer having a processor and a memory, in which a buffer is allocated for receiving a data segment;
a network interface, which is configured to receive from a packet communication network at least one packet stream comprising a sequence of data packets, which comprise headers containing respective sequence numbers and data payloads containing slices of the data segment having a predefined, fixed size per slice; and
packet processing circuitry, which is configured to receive the data packets from the network interface, and to map the data payloads of the data packets in the at least one packet stream, using a linear mapping of the sequence numbers, such that successive sequence numbers are mapped to respective addresses in the buffer that are separated by the fixed size of the slices.

2. The apparatus according to claim 1, wherein the at least one packet stream comprises first and second redundant packet streams, containing redundant first and second copies of each slice, and wherein the packet processing circuitry is configured to write the data payloads to the respective addresses via the host interface while eliminating redundant data so that the buffer contains exactly one copy of each slice of the data segment, ordered in accordance with the sequence numbers.

3. The apparatus according to claim 2, wherein the linear mapping is defined so that the first and second copies of any given slice are both mapped to a common address in the buffer.

4. The apparatus according to claim 1, wherein the mapping is defined such that each sequence number SN is mapped to an address equal to $A+(SN-X) \times B$, wherein X is an initial sequence number, B is the fixed size of the slices, and A is a base address of the buffer.

5. The apparatus according to claim 1, wherein the data payloads comprise video data, comprising multiple data segments corresponding to frames of the video data.

6. The apparatus according to claim 1, wherein the packet processing circuitry is configured to receive a work item from the processor indicating, for each data segment, an address of the buffer and the size of the slices, and to submit a completion report to the processor when all slices of the data segment have been written to the buffer.

7. The apparatus according to claim 1, wherein the at least one packet stream is transmitted in accordance with a Real-time Transport Protocol (RTP), and wherein the headers comprise an RTP header, which contains the sequence numbers.

8. The apparatus according to claim 1, wherein the data payloads comprise radio data, and wherein the at least one packet stream is transmitted in accordance with an enhanced Common Public Radio Interface (eCPRI).

9. Communication apparatus, comprising:
a host interface, which is configured to be connected to a bus of a host computer having a processor and a memory, in which a buffer is allocated for receiving a data segment;
a network interface, which is configured to receive from a packet communication network at least one packet stream comprising a sequence of data packets, which comprise headers containing respective sequence numbers and data payloads containing slices of the data segment having a predefined, fixed size per slice; and
packet processing circuitry, which is configured to receive the data packets from the network interface, and to map the data payloads of the data packets in the at least one packet stream, using a linear mapping of the sequence numbers, to respective addresses in the buffer,
wherein the data payloads comprise radio data, and wherein the at least one packet stream is transmitted in accordance with an enhanced Common Public Radio Interface (eCPRI), and
wherein the headers comprise an open radio access network (O-RAN) application layer header, and wherein the sequence numbers comprise starting physical resource block (startPrbu) values contained in the O-RAN header.

10. A method for data communication, comprising:
allocating a buffer in a memory of a host computer for receiving a data segment;
receiving in a network interface controller (NIC) of the host computer from a packet communication network at least one packet stream, comprising a sequence of data packets, which comprise headers containing respective sequence numbers and data payloads containing slices of the data segment having a predefined, fixed size per slice; and
mapping the data payloads of the data packets in the at least one packet stream, using a linear mapping of the sequence numbers, such that successive sequence numbers are mapped to respective addresses in the buffer that are separated by the fixed size of the slices.

11. The method according to claim 10, wherein the at least one packet stream comprises first and second redundant packet streams, containing redundant first and second copies of each slice, and wherein mapping the data packets comprises writing the data payloads to the respective addresses while eliminating redundant data so that the buffer contains exactly one copy of each slice of the data segment, ordered in accordance with the sequence numbers.

12. The method according to claim 11, wherein the linear mapping is defined so that the first and second copies of any given slice are both mapped to a common address in the buffer.

13. The method according to claim 10, wherein the mapping is defined such that each sequence number SN is mapped to an address equal to A+(SN−X)×B, wherein X is an initial sequence number, B is the fixed size of the slices, and A is a base address of the buffer.

14. The method according to claim 10, wherein the data payloads comprise video data, comprising multiple data segments corresponding to frames of the video data.

15. The method according to claim 10, wherein mapping the data payloads comprises receiving a work item from a processor of the host computer indicating, for each data segment, an address of the buffer and the size of the slices, and submitting a completion report to the processor when all slices of the data segment have been written to the buffer.

16. The method according to claim 10, wherein the at least one packet stream is transmitted in accordance with a Real-time Transport Protocol (RTP), and wherein the headers comprise an RTP header, which contains the sequence numbers.

17. The method according to claim 10, wherein the data payloads comprise radio data, and wherein the at least one packet stream is transmitted in accordance with an enhanced Common Public Radio Interface (eCPRI).

18. A method for data communication, comprising:
allocating a buffer in a memory of a host computer for receiving a data segment;
receiving in a network interface controller (NIC) of the host computer from a packet communication network at least one packet stream, comprising a sequence of data packets, which comprise headers containing respective sequence numbers and data payloads containing slices of the data segment having a predefined, fixed size per slice; and
mapping the data payloads of the data packets in the at least one packet stream, using a linear mapping of the sequence numbers, to respective addresses in the buffer,
wherein the data payloads comprise radio data, and wherein the at least one packet stream is transmitted in accordance with an enhanced Common Public Radio Interface (eCPRI), and
wherein the headers comprise an open radio access network (O-RAN) application layer header, and wherein the sequence numbers comprise starting physical resource block (startPrbu) values contained in the O-RAN header.

\* \* \* \* \*